Patented Mar. 8, 1949

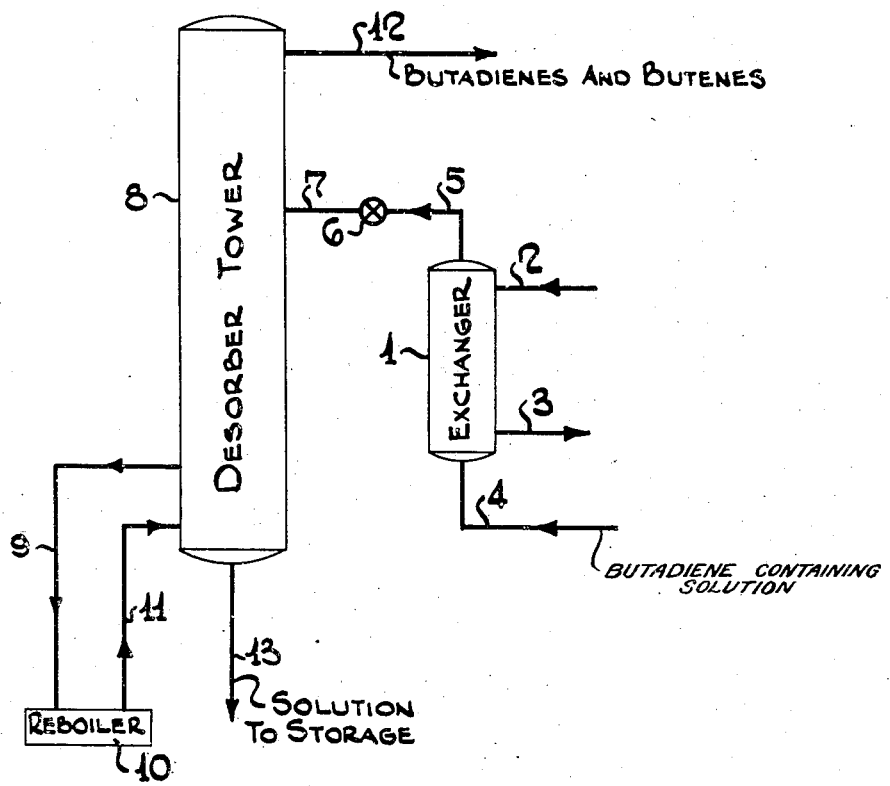

2,463,902

UNITED STATES PATENT OFFICE 2,463,902

OLEFIN EXTRACTION PROCESS

Michael A. Payne, Baton Rouge, La., assignor to Standard Oil Development Company, a corporation of Delaware Application November 3, 1944, Serial No. 561,763

1 Claim. (Cl. 260—681.5)

This invention relates to improvements in the diolefin extraction process and relates particularly to the extraction of butadiene from a mixture of saturated and unsaturated hydrocarbons in the same boiling range using an absorbent solution such as a cuprous ammonium acetate solution.

The extraction of olefins consists of three main steps: absorption, stripping and desorption. For example, in the desorption step where butadiene is to be recovered, butadiene and some associated impurities, principally butenes, are absorbed by a lean solution of cuprous ammonium acetate containing per liter about 3 mols of cuprous copper, 10 mols of ammonia, 4 mols of acetic acid and the balance water, possessing a pH value of about 10.5 to 12.5. Other strength solutions may be used containing from 2 to 5 mols of cuprous copper per liter. This step may be carried out in either vapor or liquid phase. For vapor phase absorption, packed towers are generally employed, though other types of towers may be used. In some cases where liquid phase absorption is carried out, stage mixers and settlers have been used. The cuprous ammonium acetate solution with the absorbed hydrocarbons is then stripped to remove the monoolefins (butenes), after which butadiene is desorbed. A difficulty encountered in desorbing butadiene is the tendency of the cuprous ammonium acetate solution to be carried overhead from the desorber with the gaseous hydrocarbons by foaming, mechanical entrainment, or a like phenomenon.

Foam inhibiting agents have been tried to overcome this tendency to foam but they were found to form secondary compounds which are not desirable. The foaming agent in very small concentrations, for example 0.2 or 0.3 weight per cent in the copper solution, is very potent. This foaming agent was found to be soluble in methyl-ethyl-ketone and insoluble in ethyl and petroleum ether. It was also found that this foaming agent may be adsorbed and removed by contacting with Magnesol, which consists principally of magnesium silicate, but in order to use this adsorbent it is necessary to introduce another step in the process.

According to this invention, the ammoniacal cuprous acetate solution containing the adsorbed butadine and a small quantity of butenes when preheated under pressure to the desired temperature required for the desorbing of the hydrocarbons and upon the sudden release of the pressure, will desorb without foaming difficulties, that is upon being heated first to expel the butenes and then further to expel the butadiene. The process will be more clearly understood by reading the following description with reference to the accompanying drawing, where numeral 1 indicates a heat exchanger through which a heating medium is circulated by means of pipes 2 and 3. The ammoniacal cuprous acetate solution containing absorbed hydrocarbons is introduced into the heat exchanger by means of pipe 4 and passed through pipe 5 provided with pressure release valve 6. The temperature of the ammoniacal cuprous acetate solution in heat exchanger 1 is raised to 155 to 175° F. and the pressure therein is at least 20 pounds per square inch gauge. The pressure of the solution passing through pipe 5 and valve 6 is reduced at least 5 pounds per square inch gauge, and the solution is then passed through pipe 7 into desorbing tower 8 which in this case is a packed tower. A temperature gradient is maintained in this tower, the temperature being 90–100° F. at about 15 pounds per square inch gauge at the top of the tower and 165–175° F. at the bottom of the tower. A part of the solution is withdrawn through pipe 9 from the bottom of the tower, passed through a reboiler 10 and returned to the lower part of the tower by means of pipe 11 to maintain the higher temperature in the lower part of the tower. The cuprous ammonium acetate may have both absorbed butadiene and butenes but when pure butadiene is to be recovered the other C4 hydrocarbons are first removed, butenes being stripped from the solution by means of application of heat or of recycled butadiene, and the butenes are recycled to the absorption section. The ammoniacal cuprous acetate solution containing butadiene and substantially free of butenes is further heated and subjected to the reduction in pressure after which butadiene in substantially pure form is expelled through pipe 12 without foaming.

This procedure of releasing pressure has been found to be beneficial in other extraction processes when difficulties in the separation of a liquid and a gas are encountered. It is believed that vaporization and consequent foam formation is retarded by the increased pressure on the preheater and that the latter sudden reduction in pressure mechanically reduces any foam that might otherwise have been formed in a stable form.

I claim:

In the separation and recovery of butadiene from an alkaline aqueous cuprous salt solution in which it is absorbed with butenes, the improvement which comprises preheating said solution containing the absorbed butadiene and butenes under a pressure of at least 20 pounds per square inch gauge to a temperature of 155° to 175° F., then suddenly reducing the pressure on this preheated solution as it is discharged intermediate upper and lower parts of the desorption zone, thus preventing foaming in said zone, maintaining said upper part of the desorption zone at a temperature of 90° F. to 100° F., desorbing butenes from the solution entering the desorption zone, further heating the solution discharged into the desorption zone to a temperature of 165° F. to 175° F. in the lower part of the desorption zone to desorb butadiene therefrom, and withdrawing the desorbed butene and butadiene from the upper part of the desorption zone.

MICHAEL A. PAYNE.

REFERENCES CITED

The following references are of record in the file of this patent:

UNITED STATES PATENTS

| Number | Name | Date |
| --- | --- | --- |
| 1,875,924 | Horsley | Sept. 6, 1932 |
| 1,893,586 | Horsley | Jan. 10, 1933 |
| 2,096,700 | Smith | Oct. 19, 1937 |
| 2,262,201 | Ragataz et al. | Nov. 11, 1941 |
| 2,286,453 | Angell | June 16, 1942 |
| 2,369,559 | Gilliland | Feb. 13, 1945 |
| 2,371,817 | Frey | Mar. 20, 1945 |
| 2,383,784 | Fleer | Aug. 28, 1945 |
| 2,420,906 | Packie et al. | May 20, 1947 |